Figure 1:
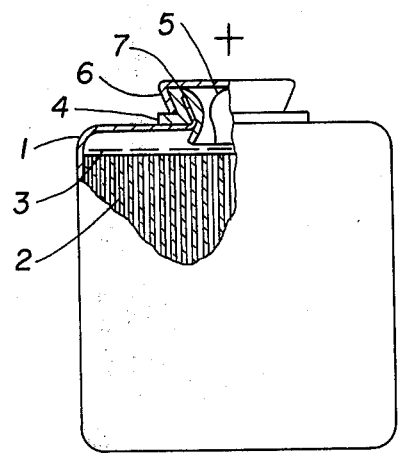

United States Patent [19]

Tietze

[11] 3,969,146

[45] July 13, 1976

[54] GAS-TIGHT SEALED GALVANIC CELL

[75] Inventor: Werner Tietze, Hagen, Germany

[73] Assignee: Varta Batterie Aktiengesellschaft, Hannover, Germany

[22] Filed: Feb. 7, 1975

[21] Appl. No.: 548,174

Related U.S. Application Data

[63] Continuation of Ser. No. 374,071, June 27, 1973, abandoned.

[30] Foreign Application Priority Data

July 19, 1973 Germany............................ 2235299

[52] U.S. Cl............................... 136/133; 136/169; 220/378
[51] Int. Cl.²......................................... H01M 2/04
[58] Field of Search ........... 136/107, 133, 169, 178; 220/213, 240, 309, 378

[56] References Cited
UNITED STATES PATENTS

| | | | |
|---|---|---|---|
| 2,772,037 | 11/1956 | Rieke.................................. | 220/309 |
| 3,285,784 | 11/1966 | Babusci et al. ..................... | 136/133 |
| 3,579,387 | 5/1971 | Voyentzie et al................... | 136/178 |
| 3,834,942 | 9/1974 | Tietze................................. | 136/107 |

Primary Examiner—Donald L. Walton
Attorney, Agent, or Firm—Herbert L. Lerner

[57] ABSTRACT

A gas-tight, liquid-tight cylindrical galvanic cell is provided with a cover integral with the cylindrical housing and having a central opening surrounded by a collar of smaller diameter than the housing and extending away from the housing. An electrically insulating ring is force fit onto the collar and an electrically conducting contact cap is force fit onto the ring. The collar is outwardly flared so that a predetermined internal pressure of the cell is required to force the cap off the ring, thereby relieving the pressure. A flexible, electrically conducting arrester element mechanically and electrically interconnects the cap and the interior of the cell. The cover having a collar is formed by rolling over the rim of a cylindrical cup-shaped container to form a cover and continuing the rolling of the rim onto a mandrel to form the collar.

3 Claims, 2 Drawing Figures

GAS-TIGHT SEALED GALVANIC CELL

This is a continuation of application Ser. No. 374,071, filed June 27, 1973, now abandoned.

The present invention relates to a gas-tight sealed galvanic cell. More particularly, the invention relates to a gas-tight storage cell or accumulator of cylindrical form the cover of which is formed by bending over the cell container, and to a method for producing the cell.

Gas-tight sealed galvanic cells are known the deep drawn cylindrical cell containers of which are sealed with a separately produced cover. These cell containers and their covers consist mostly of an electrically conducting material and are, therefore, almost always utilized for current removal and current supply. Since the cell container and the cover are at different potentials, they must be insulated from each other. The manufacture of such cell containers is very expensive, since the cover and the container must be manufactured separately. Also, for reasons associated with insulating and sealing technology, higher demands are placed upon the cover construction. This applies particularly to gas- and electrolyte-tight elements, such as gas-tight alkaline storage cells.

U.S. Pat. No. 3,230,112 discloses a gas-tight storage cell which has a cylindrical container and a bent over edge or rim. By means of this bent over rim, a cover in the form of an insulating disc, through which is led the arrester that is connected with the electrodes of one polarity, is clamped tight. Such a construction requires at the two possible leakage points, i.e. in the vicinity of the lead-in of the arrester through the cover and in the vicinity of the bent over container rim, a careful sealing by the cover.

Gas-tight galvanic cells operate in theory with low inside pressures of about 0.2 to 0.5 atmosphere. In practice, however, these values are usually exceeded, for example, when the gas formation in the cell becomes so high that not all the gases being generated can be consumed. In order promptly to release such inadmissible over-pressures to the ambient, particularly in order to eliminate the danger of an explosive destruction of the galvanic cell, safety devices are provided which respond when the internal pressure exceeds a predetermined admissible value. These safety devices are in the form of either a valve or a blast diaphragm which can be destroyed by means of a blast needle. Such safety devices should have as little volume as possible and should function in a manner adapted to the entire cell construction. In a cell container having a cover, the safety device is accommodated in the cover. To this end, the cover must be of a special construction and this entails an increase in the production cost.

German Offenlegungsschrift No. 2,031,714 discloses a gas-tight sealed galvanic cell in which a cover is formed by the bent over rim of the cell container and in this cover, a contact rivet is embedded in a gas- and liquid-tight manner. This galvanic cell has the disadvantage that an additional excess pressure valve must be installed in the contact rivet.

The object of the present invention is to provide a gas-tight sealed galvanic cell of the last mentioned type of construction but in which the aforementioned disadvantages are avoided.

In accordance with the invention this objective is achieved through the fact that the cover has a collar of smaller diameter than the container and extending away from the container and that a contact cap is pushed in a gas- and liquid-tight manner over this collar, by interpositioning an insulating ring.

Figure 2:
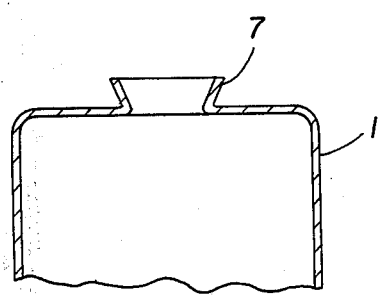

The invention is described in greater detail with reference to a specific embodiment thereof as illustrated in the drawings, in which:

FIG. 1 is an elevation, partly in section, of a galvanic cell of the invention; and FIG. 2 is a section of a fragment of the container of the cell of FIG. 1.

Accommodated in container 1 is the electrode coil 2, which may be covered by an insulating disc 3. In accordance with the invention, the plastically formed rim of the container 1 is not only reshaped to form a cover but simultaneously is provided during the rolling also with a collar 7 of substantially smaller diameter than and extending away from the container 1. Due to the rolling method used, this small centrally disposed collar can also have an undercut (FIG. 2) so that, subsequently, an electrically conductive contact cap 6 may be anchored. This new method makes it possible for the first time to manufacture gas-tight sealed galvanic cells in cylindrical form with a minimum of structural components.

Added to the advantage of the small number of structural components is also the advantage that the contact cap 6 not only seals the cell but, at the same time, is also a safety valve. This multiple function is achieved in the following manner.

The rolling device is so constructed that it plastically deforms the cup rim and produces, in the last work step, by means of a mandrel or spindle onto which the rim is rolled the previously described small collar.

After the c rim has thus been deformed, a suitable, appropriately shaped insulating ring 4 is pushed upon the collar. The insulating ring can be previously coated with an electrolyte sealing layer, such as of bitumen. The flexible, electrically conductive, positive arrester 5 can now be electrically connected to the contact cap 6 by spot welding.

The contact or sealing cap 6 can be pressed over the insulated collar 7 of the cover. During a subsequent pressing process, the cap 6 is so post-formed that it locks with the cover. For safety reasons, the arrester 5 can be provided with an insulating wrap or sheath.

By selection of the angle of the flare of the collar, it is possible to select within specific limits the force required to remove the contact cap. This is of particular importance if the contact cap is also to function as a safety valve. The removal force is also determined by the thickness of the material of the contact cap. By appropriate selection of the values of the aforementioned two parameters, it is possible, for example, to build a gas-tight sealed galvanic cell the cap of which pops off when the internal pressure exceeds 18–20 atm. In practical application, however, the values of the aforementioned parameters will be selected according to the size of the respective cell, in order to attain an adequate safety margin between the desired release pressure and the mechanical stability of the cell housing.

If an inadmissible gas pressure should develop in the interior of the cell housing, the contact cap pops off. However, because of the arrester spot welded thereonto, it cannot fly off.

The advantages of the gas-tight sealed galvanic cell of the invention include the low cost of manufacture of the cell container and the cell cover, and the good sealing against gases and electrolyte due to the small area which needs to be sealed off between the collar and the contact cap. As a particular advantage over the conventional galvanic cells, it should be emphasized that by adjusting the angle of the flare of the collar for a predetermined release pressure, the contact cap can simultaneously function as a safety valve.

I claim:

1. A gas-tight, liquid-tight, cylindrical galvanic cell comprising a cylindrical, cup-shaped container, the open end of which is bent over thereby forming a cover having an opening coaxial with the cylindrical container, a collar formed on the cover, the collar extending above and away from the cover of the container and being of smaller diameter than the container, said cover and said collar formed by re-shaping said cylindrical cup-shaped container as a unitary single structure free of joints and seals between said cover and said container and said collar and said cover, an electrically insulating ring force-fit onto the collar and an electrically conducting cap force-fit onto the insulating ring.

2. A cell according to claim 1, further comprising a flexible, electrically conductive arrester element mechanically and electrically interconnecting the interior of the cell and the cap.

3. A cell according to claim 1, in which the collar is flared outwardly.

* * * * *

UNITED STATES PATENT AND TRADEMARK OFFICE
CERTIFICATE OF CORRECTION

PATENT NO. : 3,969,146
DATED : July 13, 1976
INVENTOR(S) : WERNER TIETZ

It is certified that error appears in the above-identified patent and that said Letters Patent are hereby corrected as shown below:

In the heading to the printed specification with respect to Foreign Application Priority Data at line 11:

"July 19, 1973  Germany......2235299",  should read

--July 19, 1972  Germany...... 22 35 299 --

Signed and Sealed this ninth Day of August 1977

[SEAL]

Attest:

RUTH C. MASON
*Attesting Officer*

C. MARSHALL DANN
*Commissioner of Patents and Trademarks*